UNITED STATES PATENT OFFICE.

THOMAS HARMER, OF BURLINGTON, NEW JERSEY, ASSIGNOR TO THE MANUFACTURED RUBBER COMPANY, OF METUCHEN, NEW JERSEY, AND PHILADELPHIA, PENNSYLVANIA, A CORPORATION OF NEW JERSEY.

PROCESS OF UTILIZING WASTE-RUBBER SCRAP.

SPECIFICATION forming part of Letters Patent No. 697,338, dated April 8, 1902.

Application filed May 8, 1901. Serial No. 59,299. (No specimens.)

*To all whom it may concern:*

Be it known that I, THOMAS HARMER, a citizen of the United States, and a resident of Burlington, Burlington county, New Jersey, have invented certain Improvements in Processes of Utilizing Waste-Rubber Scrap, of which the following is a specification.

My invention relates to improvements in the process of utilizing all kinds of waste rubber, such as worn-out rubber hose, belting, rubber packing in the shape of gaskets, valves, or otherwise, worn-out car-springs, and any and all rubber articles of similar nature which have lost their elasticity, as well as the other well-known properties possessed by rubber, and are no longer fit for use.

My invention consists in restoring such rubber to its original condition by the addition of gutta-percha and one or more of the cheaper African rubber gums, together with some of the refuse by-products formed in the manufacture of certain vegetable oils. The gutta-percha which I prefer to use is that known as "pontianak," which is found in the Island of Borneo. The African gums are generally very soft and do not compare with the better grades of rubber found in Brazil and other South American countries. Of such gums I prefer to use that which is known in the trade as "flake." The vegetable-oil refuse is known as "substitute."

The refuse rubber, together with all of the material noted above, in the proper proportion, is finely ground by means of suitable crushing-rollers in any of the well-known methods common to the manufacture of rubber, and such ground mass is sifted to remove lumps and any fibrous or other foreign material, such fibrous and foreign material being discarded and the lumps reground until the mass has been reduced to the finest particles possible. This powdered material in a suitable quantity is put into a metal receptacle, preferably a tub-like structure, which may be mounted on wheels, and such receptacle, with its load of powdered material, is run into a steam-tight cylinder or other suitable chamber and subjected therein to the action of steam at a pressure of from one hundred to one hundred and twenty-five pounds for a period of from thirty-six to forty-eight hours. After this treatment the powdered material, comprising an original mixture of the refuse rubber, gutta-percha, soft natural gum, and oil substitute, has been transformed into a homogeneous viscid plastic mass having all the essential qualities of ordinary raw rubber of the usual grade and which may be afterward worked up and utilized in precisely the same manner as the ordinary Brazilian rubber gums.

The proportions of the different ingredients may vary in some instances; but I find the following to give very satisfactory results: refuse rubber, one hundred to one hundred and fifty pounds; gutta-percha, (pontianak,) fifty to seventy-five pounds; soft African gum, (flake,) eight to twelve pounds; substitute, (vegetable-oil refuse,) ten to forty pounds.

In some instances, where the resulting mixture is not to be used for the best grade of work, I may use with the mixture a quantity of powdered barytes as a filler—say twenty to thirty pounds—and when said barytes is used I sometimes prefer to dispense with the flake, although I do not wish it to be understood that the barytes is used in place of the flake.

Having thus described my invention, I claim and desire to secure by Letters Patent—

1. As a new article of manufacture, a composition of matter consisting of refuse rubber, gutta-percha, one or more of the natural soft rubber gums and an oil substitute.

2. As a new article of manufacture, a composition of matter consisting of refuse rubber, gutta-percha, one or more of the natural soft rubber gums, and a filling material.

3. As a new article of manufacture, a composition of matter consisting of refuse rubber, gutta-percha, one or more of the natural soft rubber gums, an oil substitute and a filling material.

4. As a new article of manufacture, a composition of matter comprising refuse rubber, pontianak, flake and oil substitute, in about the proportions named.

5. As a new article of manufacture, a composition of matter comprising refuse rubber, gutta-percha, one or more of the natural soft rubber gums, oil substitute, and barytes, in about the proportions named.

6. The process herein described of utilizing refuse rubber, said process consisting in mixing the same in a finely-comminuted state with gutta-percha preferably ground with the rubber, and a suitable quantity of oil substitute, and then subjecting the entire mass to the action of steam under pressure.

7. The process herein described of utilizing refuse rubber, said process consisting in mixing said rubber with gutta-percha, one of the natural soft rubber gums, and an oil substitute, reducing said mass to a finely-comminuted state by grinding and then subjecting the ground material to the action of steam under pressure.

8. The process herein described of utilizing refuse rubber, said process consisting in mixing said rubber with gutta-percha, one of the natural soft rubber gums, an oil substitute, and a filling material, reducing said mass to a finely-comminuted state by grinding and then subjecting the ground material to the action of steam under pressure.

9. The process herein described of utilizing refuse rubber, said process consisting in mixing said rubber with gutta-percha, one of the natural soft rubber gums, an oil substitute, and barytes in about the proportions named, reducing said mass to a finely-comminuted state by grinding, and then subjecting the mass to the action of steam under pressure, substantially as described.

In testimony whereof I have signed my name to this specification in the presence of two subscribing witnesses.

THOMAS HARMER.

Witnesses:
FRANKLIN C. WOOLMAN,
MURRAY C. BOYER.